Sept. 16, 1941.   A. C. WOODRUFF   2,256,038
BOAT CARRYING TRAILER
Filed Jan. 29, 1940   3 Sheets-Sheet 1
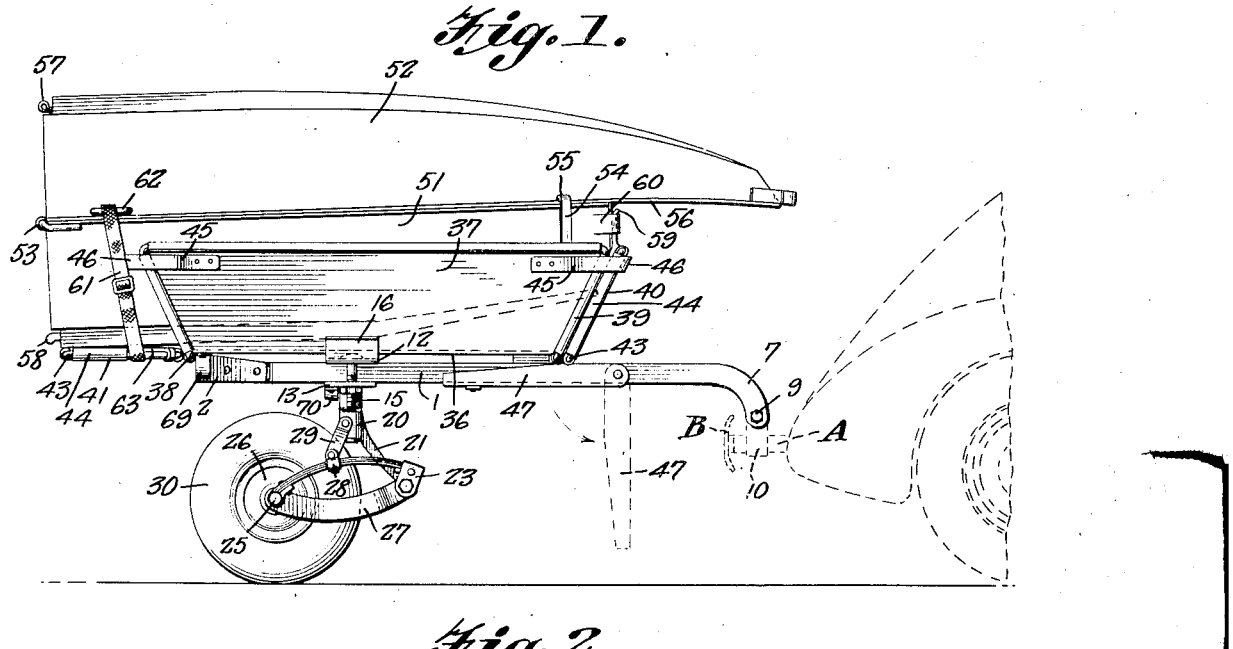
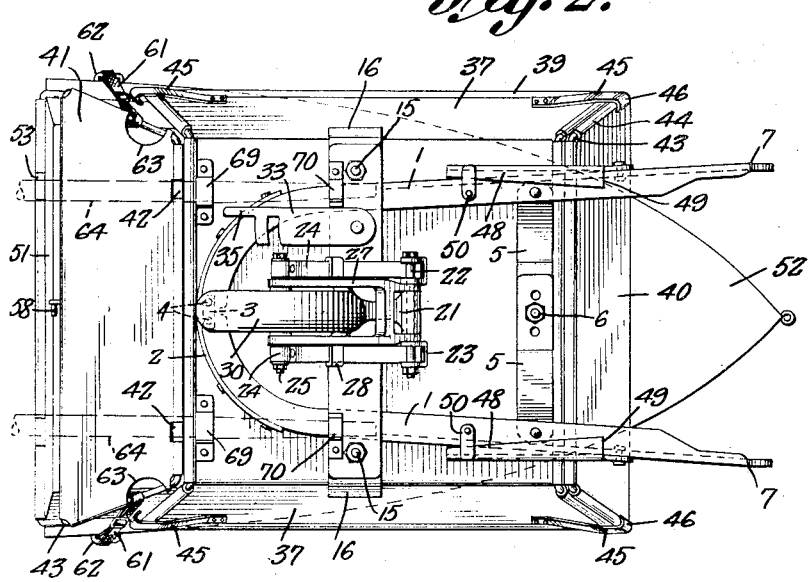
Alvie C. Woodruff,
INVENTOR
BY Victor J. Evans & Co.
ATTORNEYS

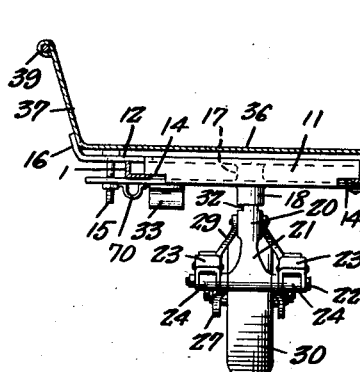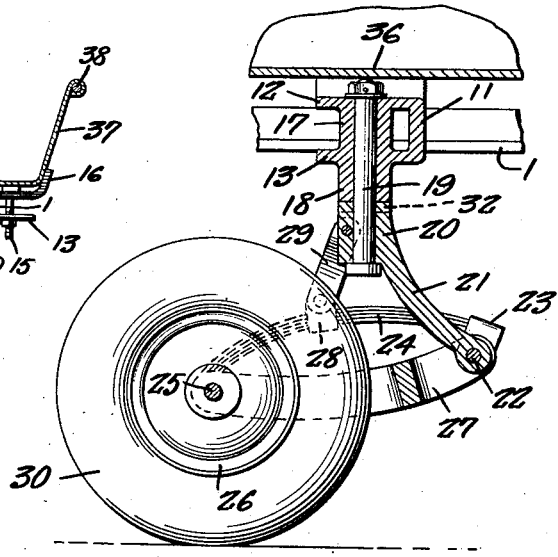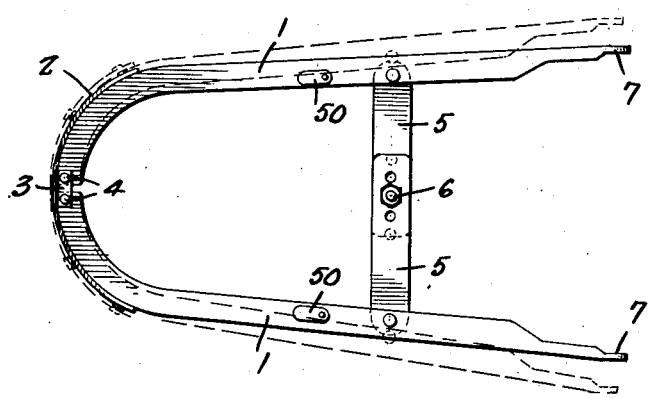

Sept. 16, 1941.     A. C. WOODRUFF     2,256,038
BOAT CARRYING TRAILER
Filed Jan. 29, 1940     3 Sheets-Sheet 3
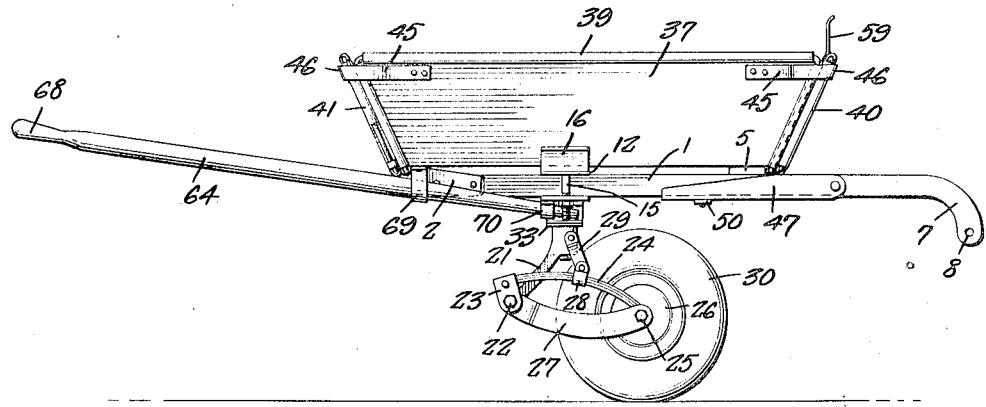
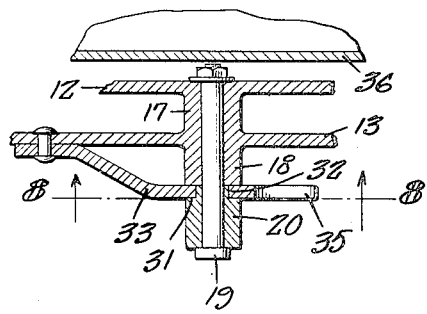
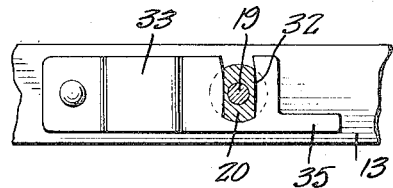
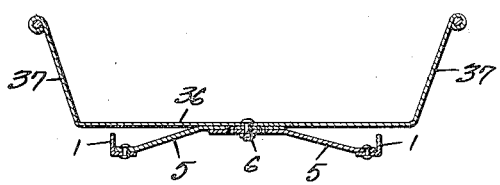
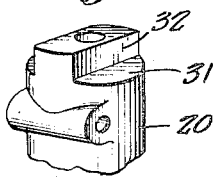
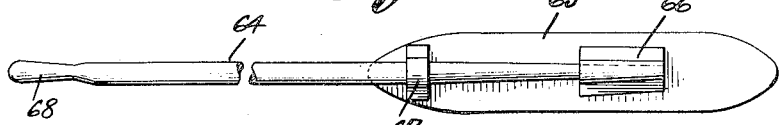

Patented Sept. 16, 1941

2,256,038

UNITED STATES PATENT OFFICE 2,256,038

BOAT CARRYING TRAILER

Alvie C. Woodruff, Juntura, Oreg.

Application January 29, 1940, Serial No. 316,238

2 Claims. (Cl. 280—106)

This invention relates to motor vehicle trailers, and its general object is to provide a trailer for use by campers and the like, in that it is designed for transporting a boat, luggage, supplies, etc. and can be easily and expeditiously attached directly to the rear bumper brackets of a vehicle, but when detached therefrom, can be readily converted into a wheelbarrow or stretcher, with the use of the boat oars or pole like members.

A further object is to provide a trailer and a foldable boat that are designed for association of the boat with the trailer, in a manner whereby the boat can be readily secured to the trailer against casual removal or displacement to assure safe transportation thereof as well as luggage, supplies, etc. that can be packed within the boat and covered thereby to protect the same against dirt, dust and weather elements.

Another object is to provide a trailer that includes a chassis frame member which is adjustable for attachment to the rear bumper brackets of a vehicle, regardless of the distance the brackets are spaced apart, and the chassis has a spring mounted caster wheel associated therewith, that is provided with means for latching the wheel against swivel movement, when the trailer is used as a wheelbarrow or stretcher.

A still further object is to provide a trailer and a foldable boat to be associated therewith, and the trailer and boat are simple in construction, inexpensive to manufacture, and extremely efficient in use and service.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:

Figure 1 is a side elevation of the trailer, with the boat secured thereto and the trailer connected to the brackets of the rear bumper of a motor vehicle.

Figure 2 is a bottom plan view of Figure 1.

Figure 3 is a transverse sectional view taken substantially midway the front and rear ends of the trailer and looking toward the caster wheel.

Figure 4 is an enlarged detail view partly in section of the caster wheel and its mounting means.

Figure 5 is a bottom plan view of the adjustable frame of the chassis.

Figure 6 is a side elevation of the trailer converted into a wheelbarrow or stretcher.

Figure 7 is a detail sectional view taken through the caster wheel mounting and the chassis cross member, and illustrates the caster wheel latching member in use.

Figure 8 is a sectional view taken approximately on line 8—8 of Figure 7, looking in the direction of the arrows.

Figure 9 is a fragmentary perspective view of the upper end of the caster wheel bracket, to illustrate the keeper for the latching member.

Figure 10 is a transverse sectional view taken through the adjustable cross brace of the chassis frame, and the body of the trailer.

Figure 11 is a plan view of one of the oars for the boat.

Referring to the drawings in detail, it will be noted that the chassis of my trailer includes a substantially U-shaped frame made up of a pair of angle iron members 1 having one of their ends curved toward each other and the curved end portions are connected together by a spring strip 2 fixed to the curved portions by rivets or the like, as best shown in Figure 5. Cooperating with the spring strip 2 for connecting the angle iron members together is a pivot strip 3 that bridges the spaced ends of the curved portions and is secured thereto by headed pivot pins 4.

Bridging the angle iron members is an adjustable cross brace that includes a pair of members 5 having one of their ends secured to the horizontal portions of the angle members, and the opposite ends are disposed in overlapped association for receiving a bolt and nut connection 6, the bolt of which is adapted for disposal through any one of the registering openings that extend along the longitudinal center of the members 5 for securing the latter in adjusted positions, as will be apparent upon inspection of Figure 5.

The outer or opposite ends of the angle iron members 1 are reduced and terminate in downwardly curved portions 7 having openings 8 at the lower ends thereof, as best shown in Figure 6, for the purpose of receiving bolt and nut connections 9 for the connection of clamping collars 10 to the downwardly curved portions, for securing the trailer to the brackets A of the rear bumper B of a motor vehicle, as clearly shown in Figure 1. By the use of the adjustable U-shaped frame member, it will be obvious that such makes it possible to attach the trailer to rear bumper brackets regardless of the distance they may be spaced apart, as well as makes it possible for attachment for my trailer to various types of bumpers and directly to the latter, thus eliminating coupling hitches now generally employed.

Bridging the angle iron members 1 rearwardly of the adjustable cross brace therefor, is a cross member 11, that may be cast or otherwise formed to provide a front wall and flat elongated superimposed frame members 12 and 13 between which are mounted the angle iron members and the front wall is slotted as at 14 to allow for adjustment of the angle iron members relative to each other, as will be apparent upon inspection of Figure 3. The frame members 12 and 13 have their outer end portions secured together to set up a clamping engagement with the angle iron members, by bolt and nut connections 15, and the outer ends of the upper frame member 12 are upwardly and outwardly flared as at 16 to provide seats for the body of the trailer, that will be later described.

Mounted between the frame members 12 and 13 is a bearing collar 17 that may be formed on the frame members and depending from the lower frame member 13 is a bearing collar 18 which cooperates with the collar 17 to provide a bearing for a headed swivel bolt 19 that extends through the collars and the frame members, as best shown in Figure 7, as well as is of a length to extend a considerable distance below the collar 18, with its head lowermost and the bolt is held accordingly by a nut threaded to the upper end thereof, as shown. Swiveled on the lower end of the bolt 19 is a mounting frame that includes a hub 20 having formed on and depending therefrom an outwardly curved arm 21 that incerases in width toward its lower end and its lower end is bored to provide a bearing for a bolt 22 that is of a length to extend beyond the outer ends of the arm, and has mounted thereon, spring clips 23 which have fixed therein one of the ends of leaf springs 24, while their opposite ends are fixed to the outer ends of an axle bolt 25 for a wheel 26 and the axle bolt 25 also has mounted thereon one of the ends of spaced parallel arcuate arms 27 having a cross member bridging the same, while the opposite ends of the arms 27 are mounted on the bolt 22, as clearly shown in Figure 4. Secured to the leaf springs 24 intermediate the ends thereof, are clamps 28 which have one of the ends of links 29 pivotally connected thereto, while the opposite ends of the links are pivotally connected to the hub 20. The wheel 26 includes the usual hub and disk wheel portion as well as a rim which has mounted therein a rubber tire 30 which may be of the solid or pneumatic type, as will be apparent.

The hub 20 has its upper end laterally reduced upon diametrically opposite sides as at 31 to provide shoulders 32 that act in the capacity as a keeper for a latching lever 33 which is pivotally connected at one end to the lower frame member 13 and has a transverse slot 34 extending from one longitudinal edge thereof and being of a width to receive the reduced upper end of the hub for engagement with the shoulders thereof, as best shown in Figure 8, to latch the wheel against swivel movement, and the lever terminates at its free end into a handle 35 to facilitate moving the same, to its latched and unlatched positions, as will be apparent.

The body of the trailer includes a flat bottom wall 36 in the form shown, and formed on and rising from the side edges of the bottom wall are outwardly flared side walls 37. The front and rear ends of the bottom wall, as well as the ends of the side walls and longitudinal edge portions of the latter are reinforced by wire 38 mounted in rolled beads 39 about the entire margin of said walls, as best shown in Figure 2.

The front and rear walls 40 and 41 are hingedly connected to the bottom wall and for that purpose the bottom wall has secured thereto hinge barrels 42 at the front and rear ends thereof, while the marginal edges of the front and rear walls are reinforced by wire 43 mounted in beads 44, with the portions of the strands of wire along the lower edges of the walls 40 and 41 mounted in the hinge barrels for free movement of the front and rear walls to open and closed positions. The front and rear walls are held in closed position by spring latch arms 45 fixed to the side walls and extending beyond the ends thereof, as well as terminating at their free ends in hooks 46 engageable with the ends of the front and rear walls, and the hooks are rounded to provide cam faces disposed in the path of the front and rear walls so that when the latter are moved to closed position they are automatically latched accordingly.

The body rests upon the chassis and is secured thereto by the bolt and nut connection 6, as well as suitable means at the forward end of the U-shaped frame, and the upwardly and outwardly flared ends 16 of the upper frame member 12 engages with the side walls 37 as best shown in Figure 3.

In order that the trailer will be self-supporting when detached from the vehicle, I provide legs 47 of angle iron formation to provide inturned flanges 48 which are cut away slightly below the upper ends of the legs to provide shoulders 49 and the legs have their upper ends pivotally secured to the vertical portions of the angle iron members 1 for movement into and out of use, as shown by the dotted and full line positions of Figure 1. The legs are preferably reduced toward their lower ends and when moved in position for use, the shoulders 49 abut the angle iron members 1 and act as stops for holding the same in said position. The legs are held in parallelism with the angle iron members when not in use, by latching members 50 pivoted to the horizontal or lower portions of the angle iron members, as best shown in Figure 5.

The boat as best shown in Figure 1, is made up of a pair of half sections, or in other words a stern section 51 and a bow section 52, each having flat inner walls for disposal in face to to face relation when the boat is in set up position, and the flat inner walls are hingedly connected to each other as at 53 for folding the boat, in a manner so that the section 52 overlies and rests upon the section 51 and is held accordingly by spring latch arms 54 having one of their ends fixed to the sides of the section 51 and their opposite or free ends terminate in cam hooks 55 for engagement with the flanged upper edges 56 of the sides of the section 52, as clearly shown in Figure 1.

The sections are held in set up position by suitable latching means made up of companion members 57 and 58 secured to the keel portions of the sections, in the form shown.

It will be obvious from Figure 1, that when it is desired to transport the boat, by the use of my trailer, the boat is folded and positioned within the body of the trailer with the stern section lowermost, and in order to secure the boat in folded position within the trailer body, I provide a pair of tongues 59 secured to the front wall 40 and rising therefrom, to be received between the stern end of the section 51 and a strap member 60 secured to the sides of the stern section and along the stern end in slightly spaced relation thereto, and the tongues 59 are outwardly flared at their free ends so as to tend to prevent upward movement of the forward end of the folded boat, as will be apparent. The rear end portion of the boat is fixed to the trailer and to the rear wall 41 in the form as shown, by straps 61 that are connected to the reinforcing strands of wire of the rear wall, as best shown in Figure 2, and the straps are likewise connected to bail members 62 secured to and extending laterally from the bow section 52. In order to facilitate fastening the straps to the reinforcing strands, it will be noted from Figure 2 that the rear wall 41 is recessed as at 63.

The oars for the boat include detachable handle members 64 that have their outer portions tapered inwardly toward their outer ends, and the outer portions are flattened to engage the flat body members 65 that are secured to the handles by tapered sheath members 66 and retaining clamps 67. The body members 65 are preferably made from light metal, and of course the same is true with respect to the sheath members and collars, and the handle members terminate in reduced hand gripping ends 68. Suitable means is provided on the boat for receiving oar locks, as will be apparent.

When it is desired to convert the trailer into a wheelbarrow or stretcher as shown in Figure 6, the handle members of the oars are removed from the body members 65, and inserted within retaining bracket clamps 69 and 70 secured to the body and the lower frame member 13, respectively and arranged so that the handle members will project from the rear end of the trailer in parallelism with each other. It will be obvious that when the trailer is used as a wheelbarrow or stretcher that the caster wheel is moved from its position of Figure 1, to that of Figure 6 and is fastened against swivel movement by the latching lever 33, as clearly shown in Figures 7 and 8.

While I have illustrated the handle members 64 as being mounted in the retaining clamps 69 and 70, it will be understood that any pole like members can be used for that purpose. In fact, the forwardly extending portions of the angle iron members 1 of the U-shaped frame can be used as handles when the trailer is used in the capacity as a wheelbarrow, and they can likewise be used together with the members 64 when the trailer is used as a stretcher. In the latter event, it will be obvious that two persons will propel and guide the trailer, one at the rear and one at the front thereof.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:

1. In a motor vehicle trailer, a wheeled chassis including a substantially U-shaped frame having its bight portion rearwardly disposed, said frame being made up of a pair of members having downwardly curved forward ends for connection to the vehicle, means pivotally connecting the rear ends of the members together to allow adjustment thereof toward and away from each other, a spring strip secured to and following the shape of the bight portion for urging the members toward each other, and adjustable bracing means for said members and secured thereto and bridging the same.

2. In a motor vehicle trailer, a chassis including a frame made up of a pair of angle iron members having inwardly curved rear end portions, pivot and resilient means connecting the rear ends of said members together for adjustment thereof and to urge the same toward each other, downwardly curved forward ends for the members for connection to the vehicle, adjustable bracing means bolted to said members and bridging the same, and a cross member including superimposed members bridging the angle iron members with the latter clamped between the same.

ALVIE C. WOODRUFF.